J. S. HAGGERTY & L. N. BEATY.
CIGAR WRAPPER CUTTER.
APPLICATION FILED MAY 18, 1917.
1,251,656. Patented Jan. 1, 1918.
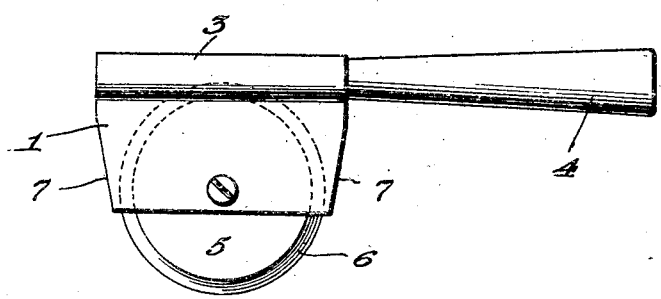
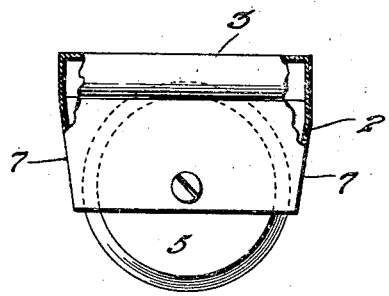
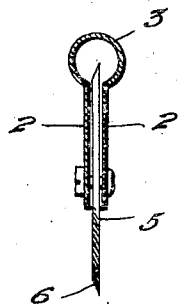
WITNESSES
P. M. Hunt
B. F. Garvey Jr.
INVENTORS
James S. Haggerty
Lawrence N. Beaty
BY Richard Ellison
ATTORNEY

UNITED STATES PATENT OFFICE.

JAMES S. HAGGERTY AND LAWRENCE N. BEATY, OF MANNINGTON, WEST VIRGINIA.

CIGAR-WRAPPER CUTTER.

1,251,656.     Specification of Letters Patent.     Patented Jan. 1, 1918.

Application filed May 18, 1917. Serial No. 169,539.

*To all whom it may concern:*

Be it known that we, JAMES S. HAGGERTY and LAWRENCE N. BEATY, citizens of the United States, residing at Mannington, in the county of Marion and State of West Virginia, have invented certain new and useful Improvements in Cigar-Wrapper Cutters, of which the following is a specification.

This invention relates to cigar wrapper cutters, the primary object of which is to provide a simple structure capable of expeditious operation without tearing the tobacco leaf.

Another object of the invention is to provide a housing for the cutting member which may be conveniently handled by the operator without danger of the cutting element coming in contact with the operator's fingers; the housing further serves in the capacity of a socket to receive a handle through the medium of which manipulation of the cutter is facilitated.

Still another object of the invention is to provide a disk cutter only one face of which is beveled, thereby facilitating sharpening of the cutter and at the same time insuring an efficient and clean cut of the wrapper or leaf.

The above and other objects and advantages of this invention will be in part described and in part understood from the following description of the present preferred embodiment, the same being illustrated in the accompanying drawings, in which:—

Figure 1 is a side elevational view of a wrapper cutter constructed in accordance with our invention;

Fig. 2 is a side elevational fragmentary view of a modified form of the invention; and Fig. 3 is a cross sectional view of the device.

In the drawings a housing 1 is provided which in this instance is preferably made of metal and comprises a single sheet which is formed to provide a pair of spaced parallel side members 2 the top of which is bowed outwardly as indicated at 3 in order to provide a cylindrically spaced rib comprising a hand hold in order to facilitate manipulation of the cutter. In the form of the invention as shown in Fig. 1, the opposite ends of the housing are closed with the exception of a small opening at the end of the cylindrical rib 3, this opening being adapted for the reception of one end of a handle 4.

A disk shaped cutter member 5 is revolubly mounted between the sides 2 of the housing and has the periphery thereof beveled to provide a cutting edge 6. The axis of rotation of the cutter 5 is appreciably above the lower margins of the sides 2, while the periphery of the cutter is appreciably spaced from the closed ends of the housing thereby minimizing danger of the operator's fingers coming in contact with the cutter during movement of the latter.

It is of course to be understood that if desired the handle 4 may be removed, and the device used with the same results. However, if it is not desired to use the handle 4, it is preferable to close the opening, which ordinarily receives the handle, as shown in Fig. 2 of the drawings, thereby eliminating the danger of a finger of the operator finding its way through said opening and into the cutter, and also preventing objects from passing through the opening and to the cutter, obviously retarding free operation of the latter. It will moreover be noted that it is preferable to incline the opposite ends of the housing, as indicated at 7, so that when the device is used without the handle 4, a better purchase of the fingers of the operator, with the housing is assured.

It will be understood that the above description and accompanying drawings comprehend only the general and preferred embodiment of our invention and that various minor changes in details of construction, proportion, and arrangement of parts may be made within the scope of the appended claim without sacrificing any of the advantages of our invention.

What is claimed is:—

A cigar wrapper cutter comprising a disk cutter and a housing for the same formed of a plate folded to lie on each side of the cutter and enlarged on the line of folding to provide a substantial cylindrical hand-hold, the ends of the housing being closed and tapered downwardly from the housing to adjacent the cutter edges, to prevent contact of the operator's fingers with the cutter.

In testimony whereof we affix our signatures in presence of two witnesses.

JAMES S. HAGGERTY.
LAWRENCE N. BEATY.

Witnesses:
W. R. FISH,
HELEN L. BERNHARDT.

Copies of this patent may be obtained for five cents each, by addressing the "Commissioner of Patents, Washington, D. C."